F. B. EILERS.
MEASURE FOR DISPENSING LIQUIDS.
APPLICATION FILED FEB. 4, 1920.
1,401,897.
Patented Dec. 27, 1921.
3 SHEETS—SHEET 3.
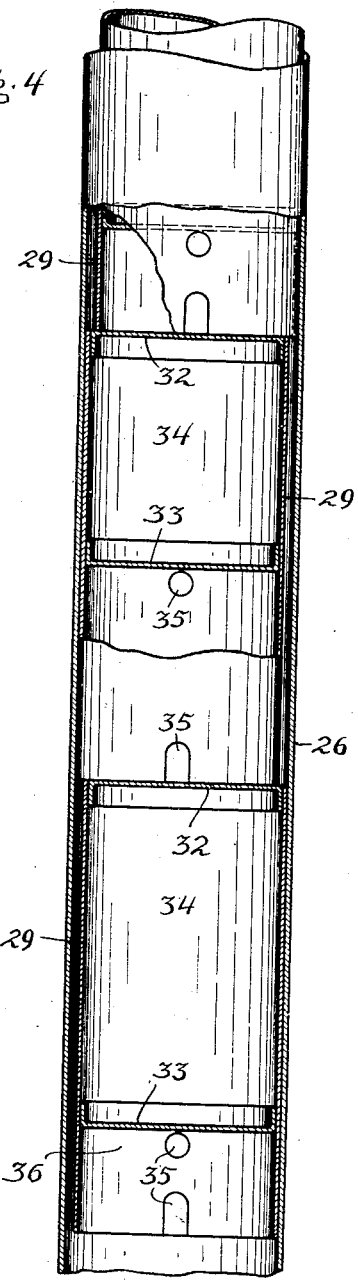
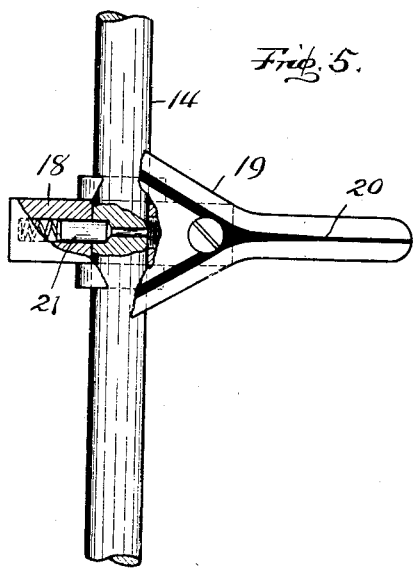
Frank B. Eilers, Inventor
By A. G. Burns, Attorney

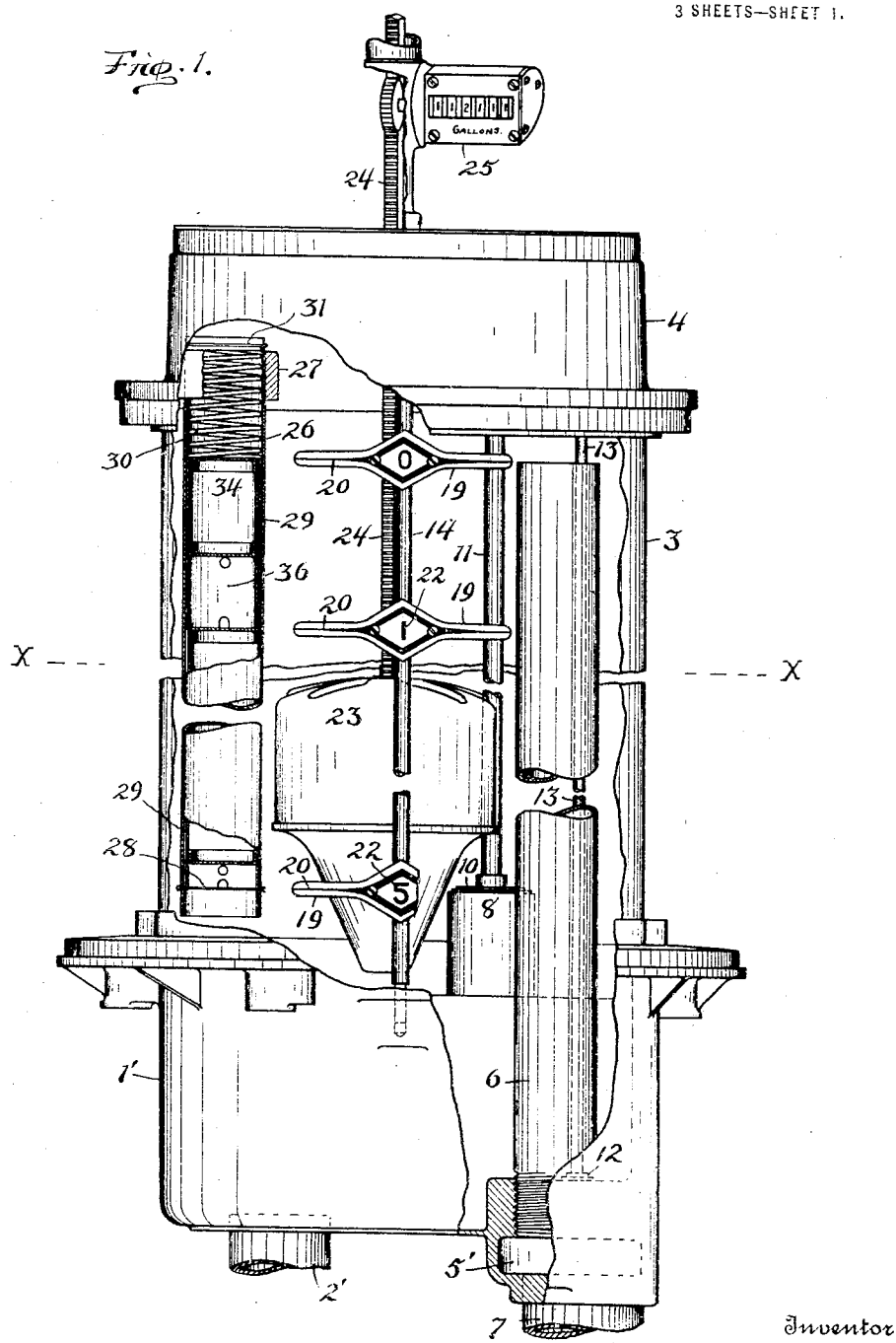

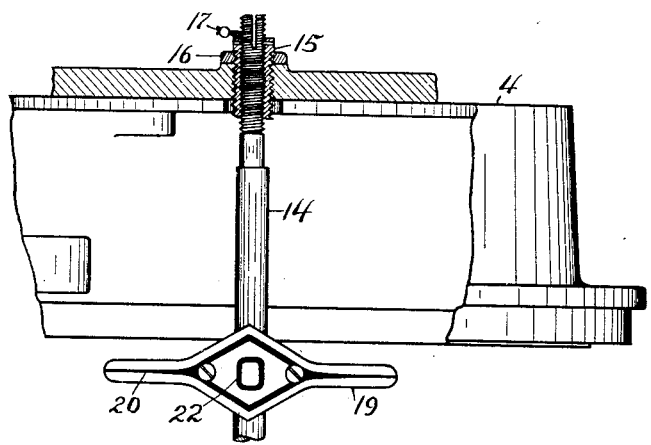
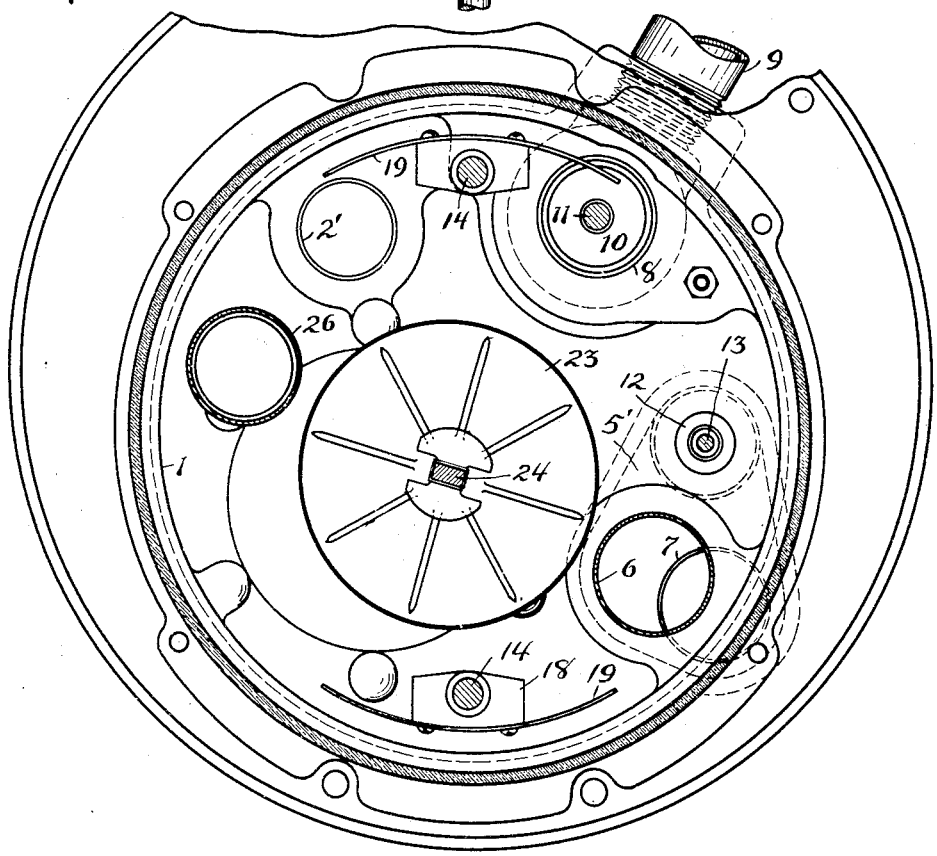

UNITED STATES PATENT OFFICE.

FRANK B. EILERS, OF FORT WAYNE, INDIANA, ASSIGNOR TO TOKHEIM OIL TANK AND PUMP COMPANY, A CORPORATION OF INDIANA.

MEASURE FOR DISPENSING LIQUIDS.

1,401,897. Specification of Letters Patent. Patented Dec. 27, 1921.

Application filed February 4, 1920. Serial No. 356,311.

*To all whom it may concern:*

Be it known that I, FRANK B. EILERS, a citizen of the United States of America, and resident of Fort Wayne, in the county of Allen and State of Indiana, have invented certain new and useful Improvements in Measures for Dispensing Liquids, of which the following is a specification.

This invention relates to improvements in measures for dispensing liquids, and the objects thereof are: first, to provide a measure for holding and displaying liquid to be dispensed in quantities visibly indicated thereby, so constructed that the levels of definite quantities of liquid in the measure may be made to correspond with the various predetermined gage levels established therein; second, to provide means for displaying a quantity of liquid to be dispensed, so constructed that the quantitative discharge of liquid from the measure, whether as a whole or fractional parts thereof, may be observed as it occurs and the quantity so dispensed thereby ascertained; and third, to provide compensating means capable of effecting equality of content of the vessel between the various gage levels.

The objects of the invention are accomplished by the construction illustrated in the accompanying drawings in which:

Figure 1 is an elevation of the measure partially broken away and in section showing the general arrangement of parts;

Fig. 2 is a detail view showing the construction employed for adjusting the gage indicator;

Fig. 3 is a transverse section of Fig. 1 on the line *x—x* thereof;

Fig. 4 is a vertical elevation, of the compensating device partly broken away and in section; and Fig. 5 is a detail view showing the manner of securing the gage indicator to its support.

Similar characters of reference indicate corresponding parts throughout the several views and referring now to the same:

1' is a bowl into which is receivable the liquid, to be dispensed, through a pipe 2' entering the bottom thereof. Surrounding the top is a glass cylinder 3 and thereupon is fixed a cover 4 closing the same. In the lower part of the bowl is a pocket 5' which has communication with an overflow pipe 6 that extends vertically into the glass cylinder. A return pipe 7 has communication with the pocket 5' and extends downwardly therefrom and is intended for connection with the source of supply of liquid to be dispensed. A discharge port 8 is provided in connection with the bowl and has connection with a dispensing pipe 9, and a discharge valve 10 mounted upon the valve rod 11 is provided for controlling the discharge port.

In the lower part of the bowl 1' is located a drain valve 12 for controlling passage of liquid in the bowl into the pocket 5', the valve being operated by a valve rod 13. The discharge-valve rod and also the drain-valve rod are intended to be operated by lifting them vertically so that the respective valves are raised from their seats, and in these operations any suitable means (not shown) may be employed for that purpose.

Positioned vertically within the cylinder are two standards 14, each being supported at its lower end in the casting forming the bowl and at its upper end in an adjustable sleeve 15 that is internally and externally threaded, the external threads being of a different pitch from the internal threads. The sleeve has threaded relation with the cover 4 through which it extends and with the threaded upper end of the standard which extends therethrough. By adjustably turning the sleeve the standard is raised or lowered accordingly, and the sleeve is secured in adjusted positions by a jam-nut 16. The sleeve is secured from being turned relative to the standard by applying an ordinary seal 17, the sleeve being perforated horizontally and the upper end of the standard being slotted vertically to facilitate the application of the seal. Upon each standard is secured a series of blocks 18, each having fixed thereon a plate 19 bearing a horizontally disposed indicating mark 20. The blocks 18 are spaced equal distances apart and are held permanently in their respective positions on the standards by corresponding pins 21 that engage their standard, and are thereby also prevented from turning thereon. These standards, together with their plates, constitute duplicate gage members so situated that readings may be made by observation from opposite sides of the measure. Each gage member is vertically adjusted so that the indicating mark 20 on its lowermost plate 19 registers with the liquid level at the discharge port 8 when the measure has been emptied therethrough. Also, the overflow pipe 6 is positioned so that the overflow level of liquid in the measure registers with the indicating mark on the uppermost plate of the gage member. The intervening plates on the gage members are intended to indicate respectively the liquid levels of various unit quantities of liquid held in the measure, or fractional parts thereof as desired. The plates also bear characters 22 which are significant of the quantity of liquid withdrawn from the measure when the level of liquid has receded therein to their respective indicating marks.

Within the measure is suspended a float 23 at the end of a rack bar 24 which has operating relation with an odometer 25 of known construction. The float is adapted to be raised by the liquid as the measure is filled, and to descend as the measure is emptied, thus imparting movement to the rack bar by which the odometer is actuated and the quantity of liquid discharged from the measure registered.

In manufacturing measures in which cylinders of glass are employed, it has been found that the cylinders ordinarily available vary in diameter from one end to the other and also in thickness of their walls and consequently their containing capacity varies more or less throughout their length and the liquid level established by definite unit quantities of liquid placed therein consequently varies with the peculiarities of the individual cylinders. Therefore, a feature of the invention is the provision of means to cause the liquid level in the measure to correspond precisely with the indicating marks on the gage members according to the number of units of liquid therein contained. For this purpose, there is arranged vertically within the measure a tubular receptacle 26 which is rigidly held by a bracket 27 in the cover 4, the tube being open at both ends so that liquid may rise and fall therein as the measure is filled and emptied. In the lower part of the tube is a cotter-pin 28 which serves as a rest for the lowermost displacement member 29 which is positioned within the tube. Other displacement members are also positioned within the tube in successive order and rest respectively upon the tops of the preceding members. A compression spring 30 in the upper part of the tube 26 bears against the top of the uppermost displacement member, and a cotter-pin 31 extending through the tube above the spring serves to hold the spring in position, thus the displacement members are held within the tube in a compact pile. Each displacement member 29 is tubular and is closed at its upper end by a head 32, and has a transverse partition 33 so that a closed chamber 34 is formed in the upper portion of the member, the lower end of the member is open and has also openings 35 extending through its vertical wall at points beneath the partition 33, so that liquid may enter and recede from the cavity 36 in its lower end. The displacement members are formed with closed chambers 34 of various sizes by positioning the partition 33 as desired when it is constructed so that it will have the effect of displacing more or less the liquid in which it is submerged accordingly. In placing the displacement members in position, they are selected according to the size of their closed chambers so that the displacement of the liquid in the measure will be the amount required to raise the level of the liquid to correspond with the indicating mark on the gage member for the particular unit of which the liquid so displaced is a part. The displacement members correspond in number and position with the spaces between the indicating marks on the gage members so that each unit quantity of liquid may be individually displaced and its level made to correspond with its particular indicating mark.

The discharge level in the measure at the port 8 is permanently fixed, and the overflow pipe, gage members and the tubular receptacle are each vertically adjustable in relation to the port discharge level so that they may be accurately positioned in the measure and consequent correct functioning of the device attained.

In the operation of the invention the measure is charged with liquid through the supply pipe 2' which is intended for connection with a pumping means (not shown). Such liquid as rises above the level at the top of the overflow pipe passes therethrough into the pocket 5' and thence through the return pipe 7 to the source of liquid supply (not shown) which is intended to be connected therewith to receive such surplus. As the measure is thus filled the float therein rises together with the rack bar attached thereto. The liquid content of the measure may then be viewed and the quantity thereof ascertained by comparing its level with the indicating marks on the gage members. Thus, when the measure is full the level of liquid will correspond with the indicating marks on the uppermost plates of the respective gage members. The liquid thus displayed is withdrawn from the measure by lifting the discharge valve so as to open the discharge port and permit the liquid to pass out through the dispensing pipe. The amount of liquid thus discharged is indicated by the extent of the recession of the level of liquid in the measure as it passes the indicating marks successively from the uppermost to the lowermost, the indicating marks signifying respectively the unit quantities of liquid discharged as the level of liquid recedes to their respect planes. Also as the liquid in the measure recedes, the float and rack descend accordingly which effects actuation of the odometer.

Such liquid as is held in the device below the level of the discharge port may be withdrawn by opening the drain valve which admits it to the pocket 5' and from whence it may pass through the return pipe 7 to the source of supply.

What I claim is:

1. In a measure for dispensing liquids; a container having transparent walls adapted to receive and display a quantity of liquid to be dispensed and having a valve controlled discharge port in its lower portion and an overflow pipe therein, the receiving end of which is located in its upper portion, said overflow pipe being adapted to be adjustably positioned; gage members adjustably positioned within the container, each having a series of plates spaced apart and having indicating marks thereon respectively, and a pile of displacement members including means for their support in respective positions corresponding with the spaces between the indicating marks of the gage members, said displacement members being so proportioned respectively that the quantities of liquid held in the container in the several spaces between the indicating marks of the gage members are of definite predetermined quantities.

2. In a measure for dispensing liquids, a transparent container having a discharge port in its lower part and an overflow outlet in its upper part; a gage member having a series of indicating marks spaced apart; means for adjusting the gage member relative to the discharge port and overflow outlet, and compensating means positioned within the container including a series of members so proportioned and arranged respectively as to displace the liquid within the container in the corresponding spaces between the indicating marks of the gage member so that the quantities of liquid held in the several spaces are of a definite predetermined quantity.

3. In dispensing apparatus having a measure for holding and displaying liquid, there being a series of indicating marks in connection with the measure, a series of compensating members movably positioned within the measure arranged respectively in the spaces between the indicating marks and being so proportioned as to displace the liquid in the measure in the corresponding spaces that the respective quantities of liquid remaining in the several spaces are of definite predetermined quantities.

4. In a measure for holding and displaying liquid to be dispensed therefrom having gage means with a series of indicating marks spaced apart, compensating means so proportioned and arranged within the measure as to displace liquid in the spaces between the indicating marks so that the respective quantities of liquid held in the several spaces are of definite predetermined quantities.

5. In a measure for holding and displaying liquid to be dispensed therefrom having a valve controlled discharge port and overflow outlet and gage means with a series of indicating marks spaced apart, an open receptacle positioned within the measure, and a series of displacement members in the receptacle arranged in successive order in positions corresponding respectively with the spaces between the indicating marks, each member being so proportioned as to displace the liquid in the measure within the corresponding space so that the remaining liquid in said space is of a definite predetermined quantity.

6. In a measure for holding and displaying liquid to be dispensed therefrom having gage means with indicating marks spaced apart, a compensating means within the measure so constructed and proportioned as to displace the liquid in the measure in each space between the corresponding indicating marks so that the remaining liquid in each space is of a definite predetermined quantity and a means open to the measure for holding the compensating means in proper relation to the indicating marks.

7. In apparatus of the class described, a measure adapted to hold and display liquid to be dispensed therefrom and having gage means with indicating marks spaced apart; an open receptacle within the measure; a series of displacement members arranged in the receptacle in respective positions corresponding with the spaces between the indicating marks, each being so proportioned as to displace the liquid in the measure in the corresponding space so that the remaining liquid in said space is of definite predetermined quantity; and means for holding the members in proper positions.

8. In apparatus of the class described, a measure adapted to hold and display liquid to be dispensed therefrom having a discharge port and overflow outlet; a gage means adapted to indicate quantities of liquid held in the measure between its discharge port and overflow outlet; and a compensating means in the measure adapted to displace liquid held therein so that the quantity remaining in the measure between its discharge port and overflow outlet conforms with the indicating marks of the gage means.

In testimony whereof I affix my signature, in presence of two witnesses.

FRANK B. EILERS.

Witnesses:
C. O. GRIFFIN,
WALTER G. BURNS.